Jan. 1, 1946.  A. W. FERRE  2,392,283
HEATER
Filed Feb. 26, 1944  3 Sheets-Sheet 1

Inventor.
ALBERT W. FERRE
By Robert T. Palmer
Attorney.

Jan. 1, 1946. A. W. FERRE 2,392,283
HEATER
Filed Feb. 26, 1944 3 Sheets-Sheet 2
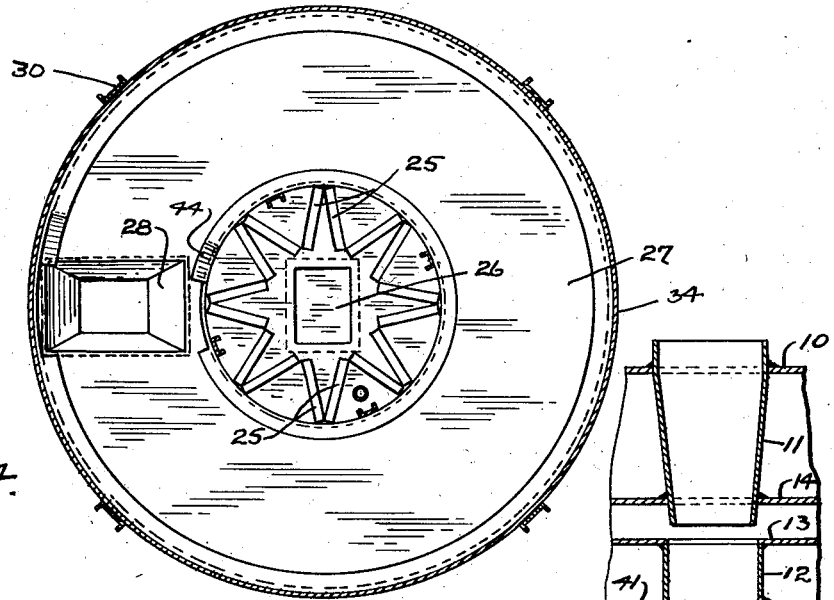
Fig. 4.
Fig. 8.
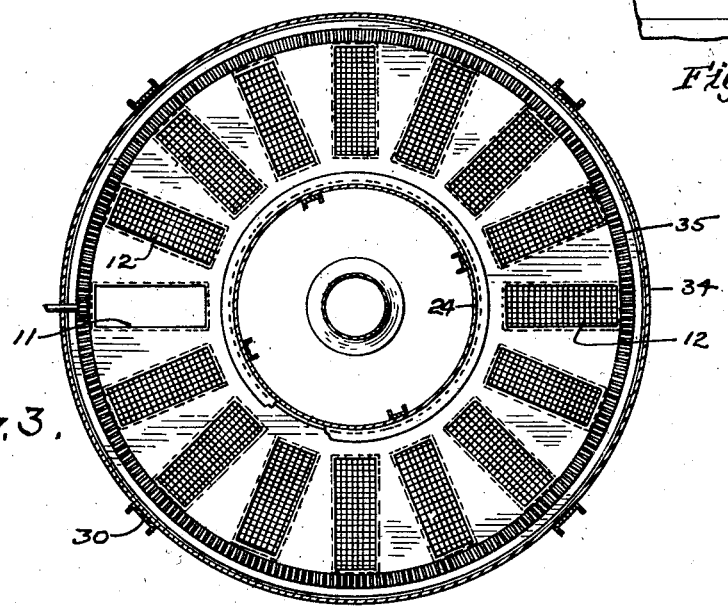
Fig. 3.
Inventor.
ALBERT W. FERRE
By, Robert T. Palmer
Attorney.

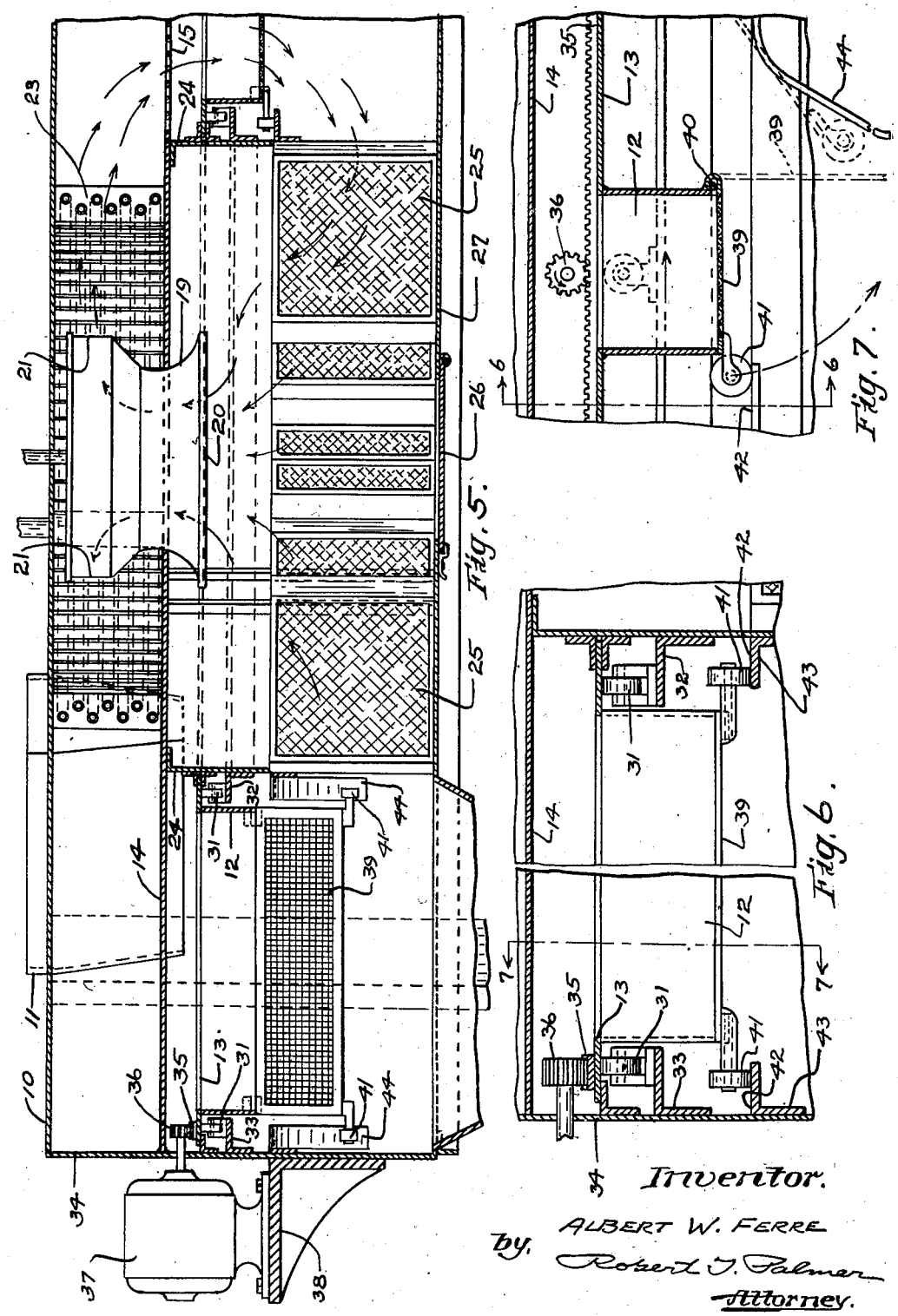

UNITED STATES PATENT OFFICE 2,392,283

HEATER

Albert W. Ferre, Wellesley, Mass., assignor to
B. F. Sturtevant Company, Boston, Mass.

Application February 26, 1944, Serial No. 524,082

2 Claims. (Cl. 34—82)

This invention relates to heaters and relates more particularly to heaters for heating dehydrated food prior to its being compressed.

This invention provides a rotary type heater which is particularly suitable for heating dehydrated food for placing it in condition for being compressed in a hydraulic press. A rotary table has mounted thereon a plurality of baskets for receiving, in succession, weighed quantities of dehydrated food. The drive for the table is controlled by the press so as to start rotation after a basket has dumped its contents into the press, so as to move a new basket in position for dumping. Each basket automatically dumps when in alignment with the press. A weighing machine dumps food into the baskets after they are rotated in alignment therewith. The press acts to stop rotation of the table when the baskets are loading and dumping. As the baskets are rotated between the loading and dumping stations, heated air is recirculated therethrough for heating the food contained therein. The rate of rotation of the table, and the velocity and temperature of the air are so coordinated that the food is sufficiently heated by the time it is dumped into the press.

Objects of the invention are to preheat food so as to make it compressible and to accomplish this at high speed.

Other objects of the invention are to reduce the size of, and the attention required by, food heaters.

The invention will now be described with reference to the drawings, of which:

Fig. 3 is a sectional view along the lines 3—3 of Fig. 1;

Fig. 4 is a sectional view along the lines 4—4 of Fig. 1;

Fig. 5 is an enlarged view in vertical section, of a portion of the dryer;

Fig. 6 is an enlarged view in vertical section illustrating the supports for the rotary table and the baskets, and is taken along the lines 6—6 of Fig. 7;

Fig. 7 is a sectional view along the lines 7—7 of Fig. 6, and

Fig. 8 is an enlarged sectional view of the duct for discharging food from the weighing machine into the baskets.

Figure 2:
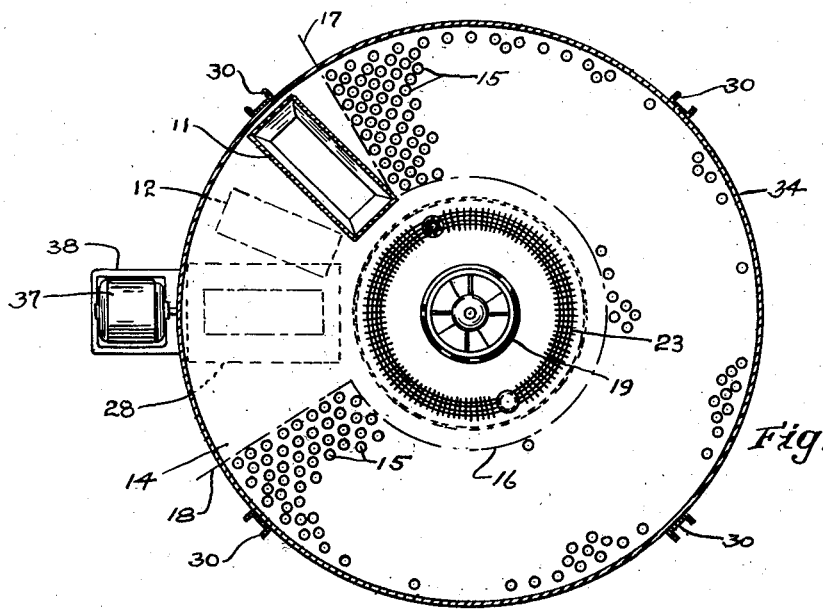
Fig. 2 is a sectional view along the lines 2—2 of Fig. 1.
Figure 1:
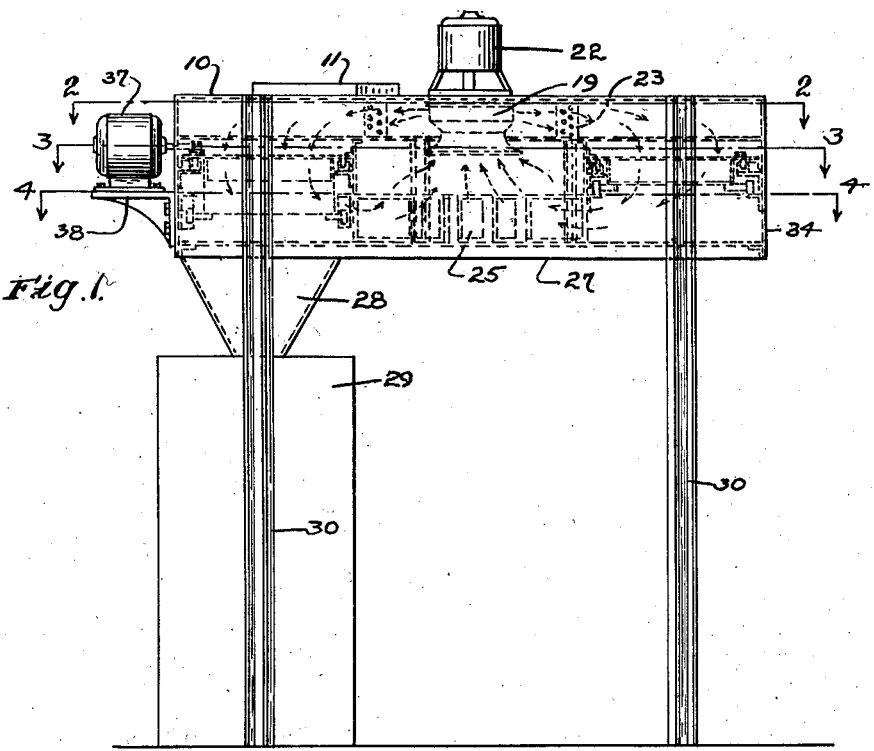
Fig. 1 is a side elevation of a heater embodying this invention.

Referring first to Figs. 1, 2 and 5, the heater has the upper, horizontal, circular wall 10 with the duct 11 extending therethrough but which otherwise is continuous. The duct supplies food from the weighing machine (not shown) into the baskets 12 which are supported from the lower surface of the annular, rotary table 13.

The circular wall 14 is spaced below and arranged parallel to the wall 10 and with reference to Fig. 2, has the circular perforations 15 therethrough between the circular line 16 and its outer edge and between the radial lines 17 and 18 in a clockwise direction with respect to Fig. 2. It is not perforated between the lines 17 and 18 in a contraclockwise direction with respect to Fig. 2.

The centrifugal fan 19 extends through the wall 14 at its center. The fan 19 is a conventional fan having an axial inlet passage at 20 and a radially extending, circumferential discharge passage at 21. The fan is driven by the electric motor 22.

The conventional finned, circular heater 23 is arranged between the walls 10 and 14 around the outlet 21 of the fan 19.

The cylindrical wall 24 extends around the inlet 20 of the fan and is attached to the lower surface of the wall 14. The conventional filter blocks 25 which may contain steel or glass wool or other suitable filtering material, are arranged in pairs forming V's with the apices under the lower edge of the wall 24 as illustrated most clearly by Fig. 4. With this arrangement maximum filter surface for the space available, is provided.

The lower wall 27 which also is circular, closes off the lower side of the unit and has the access door 26 for servicing. The food discharge hopper 28 extends through the wall 27 in alignment with the inlet of the hydraulic press 29. The unit is supported above the press 29 by the structural beams 30.

The rotary table 13 is supported on the rollers 31 which in turn are supported for rotation, by the members 32 and 33 to the cylindrical wall 24 and the cylindrical side wall 34 of the unit, respectively. The rack 35 extends around the outer portion of the table 13 and on its upper surface and has meshed with its teeth, the teeth of the pinion gear 36 which is rotated by the electric motor 37. The motor 37 is supported by the member 38 to the wall 34.

The baskets 12 have open tops, solid side and end walls and the wire mesh bottoms 39. The table 13 has openings therein in alignment with the tops of the baskets. Each basket bottom 39 is pivoted along one side thereof to its basket at 40 as shown by Fig. 7 and has the rollers 41 rotatably attached to the opposite ends of its other side. The rollers 41 rest on the horizontal surface 42 of the member 43 which is attached to the inner surface of the wall 34, when the table 13 is rotating the basket between unloadings. At the unloading station, the surface 42 terminates as illustrated by Fig. 7 so that the bottom 39 swings downwardly to permit the contents of the basket to be discharged into the hopper 28. Then when the rotation of the table 13 is started again by the press 29, the rollers 41 ride up the curved walls 44, the upper surfaces of which end in alignment with the horizontal surface 42 so that the bottoms 39 are automatically closed. A space corresponding to that occupied by one basket is used for closing the basket bottom so that the table rotates through two basket positions during the opening and closing of each basket bottom.

As shown by Fig. 2, the loading duct 11 is spaced two baskets from the discharge hopper 28.

In operation, the fan 19 recirculates air through the heater 23, the perforations 15 in the wall 14, through the baskets 12 and their wire mesh bottoms 39 and through the filters 25. Conventional dampered passages may be used for venting off moist air and for admitting make-up air into the circuit.

Controls actuated by the press and which are not illustrated since forming no part of this invention, start and stop the rotary table 13 when the press has completed a pressing stroke and is ready for a new pressing stroke, respectively. The press thus stops the table as by opening the circuit of the motor 37 or by opening a clutch in the motor drive, when it is ready to receive a load of dehydrated food from a basket, and starts the table to rotating when it has received the load, so that when it is again ready to receive a load, another basket will be in position to dump. As previously described the baskets dump automatically when lined up with the hopper 28.

The portion of the wall 14 in the loading and unloading area, since not being perforated, prevents the escape of any substantial volumes of heating air at the loading and dumping stations.

What is claimed is:

1. A heater comprising a housing having an upper, substantially horizontal wall, a second, substantially horizontal wall spaced below said upper wall, a lower substantially horizontal wall spaced below said second wall, an annular, rotary table having a central opening and having a plurality of substantially equally spaced openings around said central opening, means for supporting said table for rotation between said second and lower walls, a plurality of food receiving baskets attached to the underside of said table in alignment with said equally spaced openings, a fan having an axial inlet passage extending through said second wall and arranged substantially centrally of said central opening and having a circumferentially extending outlet between said upper and second walls, an annular heater extending between said upper and second walls circumferentially around said outlet, a duct for loading said baskets extending through said upper and second walls to a point adjacent said table, said baskets having open tops and perforated bottoms, and means forming a discharge passage through said lower wall for food unloaded from said baskets, said discharge passage being so circumferentially spaced from said duct that when baskets are in alignment therewith, one basket is therebetween at the unloading and loading side of said heater, said second wall being imperforate over said discharge passage and over the space traversed by baskets moving between said discharge passage and duct after the baskets are unloaded, and having perforations therein over the space traversed by baskets moving between said duct and discharge passage after the baskets are loaded, whereby upon rotation of said baskets between said duct and said discharge passage after said baskets are loaded, said fan recirculates air through said heater, said perforations and said baskets.

2. A heater comprising a housing having an upper substantially horizontal wall, a second substantially horizontal wall spaced below said upper wall, a lower substantially horizontal wall spaced below said second wall, an annular, rotary table having a central opening and having a plurality of substantially equally spaced openings around said central opening, means for supporting said table for rotation between said second and lower walls, a plurality of food receiving baskets attached to the underside of said table in alignment with said equally spaced openings, a fan having an axial inlet passage extending through said second wall and arranged substantially centrally of said central opening and having a circumferentially extending outlet between said upper and second walls, an annular heater extending between said upper and second walls circumferentially around said outlet, a duct for loading said baskets extending through said upper and second walls to a point adjacent said table, said baskets having open tops and perforated bottoms, a plurality of filters between said lower wall and said inlet passage, said filters forming a plurality of contacting V's with apices below said central opening, and means forming a discharge passage through said lower wall for food unloaded from said baskets, said discharge passage being so circumferentially spaced from said duct that when baskets are in alignment therewith, one basket is therebetween at the unloading and loading side of said heater, said second wall being imperforate over said discharge passage and over the space traversed by baskets moving between said discharge passage and duct after the baskets are unloaded, and having perforations therein over the space traversed by baskets moving between said discharge passage and duct after the baskets are loaded, whereby upon rotation of said baskets between said duct and said discharge passage, said fan recirculates air through said heater, said perforations, said filters and said baskets.

ALBERT W. FERRE.